3,297,256
THRUST CONTROLLED ROCKET MOTOR
Frederick R. Hickerson, Newton, and Carl P. Iosso, Dover, N.J., assignors to the United States of America as represented by the Secretary of the Army
Filed July 8, 1965, Ser. No. 470,647
2 Claims. (Cl. 239—265.19)

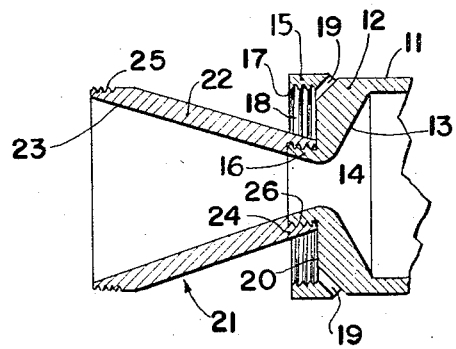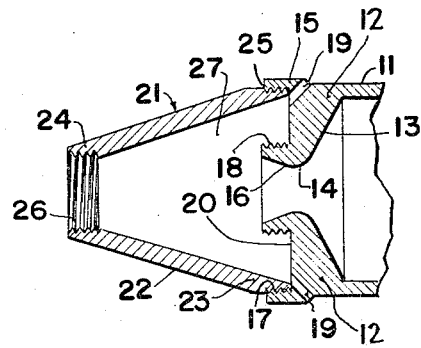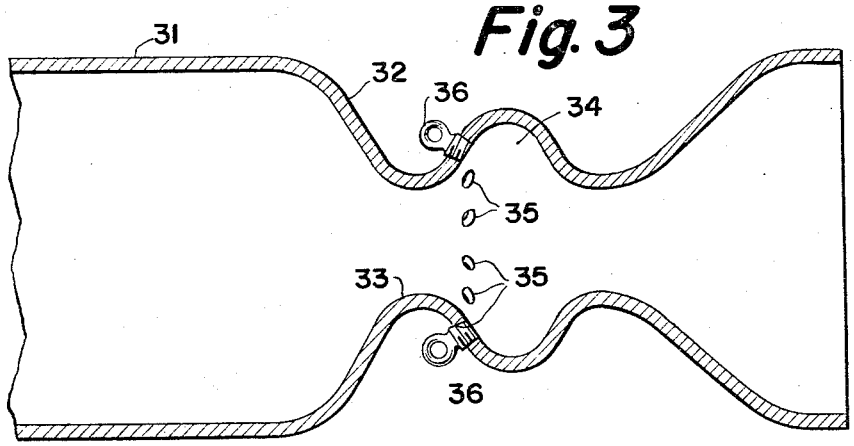

The invention described herein may be manufactured and used by or for the Government for governmental purposes without the payment to us of any royalty thereon.

This invention relates to rockets, and more particularly to artillery rockets employed for distant targets or objectives at a predetermined range.

One of the objects of the invention is to provide such a rocket structure having a simple thrust control which is reliably accurate, rugged and contains no moving parts.

Another object of the invention is to provide such structure capable of multistage thrust control or zoning selection by inexperienced field personnel wherein a constant rocket motor pressure is produced at all thrust levels resulting in the maximum of performance and interior ballistic characteristics.

In one aspect of the invention a rocket motor construction is provided having a nozzle structure for exhausting pressure fluid to normally provide a predetermined rocket motor thrust, and means adjacent and downstream of the nozzle for selectively varying the rocket motor thrust.

These and other objects, features and advantages will become apparent from the following description and accompanying drawings in which:

FIG. 1 is a sectional view of a preferred rocket motor nozzle construction embodying the principles of the invention.

FIG. 2 is a view similar to FIG. 1 with the nozzle expansion section reversed.

FIG. 3 is a sectional view of a modified rocket motor nozzle construction.

The rocket motor combustion chamber wall 11 preferably is of cylindrical shape and terminates in a rear annular flange 12 whose inner surface 13 is inclined toward nozzle or throat constriction 14. Preferably, rear flange 12 is provided at its end portions with rearwardly extending, concentrically spaced attaching or annular members 15, 16 which have respective inner and outer thread portions 17, 18. A plurality of diametrically opposed pairs of apertures 19 are formed in a circular pattern about the rear face 20 of flange 12, each aperture 19 being inclined to provide the flange rear surface 20 in communication with the exterior of rocket wall 11. A reversible nozzle expansion section shown generally at 21 is in the form of a tubular member having a conically-shaped sidewall 22 terminating in axially and transversely spaced, annular end portions 23, 24. The larger end 23 has external threads 25 that mate (FIG. 2) with the internal threads 17 of annular member 15, and the internal threads 26 on the smaller end 24 mate (FIG. 1) with the external threads 18 of annular member 16. Thus, by selectively securing one of the conical section attachment threads, 25 or 26, to its correspondingly mating attaching means on the rear or throat portion of the rocket motor, the conical section may be selectively employed downstream of nozzle 14 to render exhausting gas apertures 19 effective in reduced pressure chamber 27 (FIG. 2) or ineffective (FIG. 1) to vary the rocket motor thrust between the maximum thrust condition of FIG. 1 and the low thrust condition of FIG. 2. Further, an intermediate thrust condition may be provided when the nozzle expansion section 21 is removed from the rocket structure. By employing a rocket motor construction with a selective thrust arrangement, the rocket motor at predetermined inclinations is capable of delivering missiles or the like to targets at varying ranges of fire.

In the rocket motor nozzle construction of FIG. 3, combustion chamber sidewall 31 preferably is of cylindrical contour terminating in an inwardly tapering annular rear surface 32 to an integral nozzle or throat constriction 33. Immediately adjacent and downstream of the throat 33 is an enlarged chamber 34 that in operation provides a reduction in exhausting gas pressure and a corresponding collection of a portion of the exhausting gas. A plurality of diametrically opposed pairs of apertures 35 are provided in the forward wall portion of chamber 34 adjacent the nozzle or throat 33. Each aperture 35 contains a threaded or otherwise removable nozzle plug 36. Selected diametrically opposed pairs of plugs are thus removable to proportionally reduce or vary the rocket motor thrust to the extent desired. In certain arrangements, as many as 20 (ten diametrically opposed pairs) plugged apertures are provided, permitting a wide range of thrust control for a particular dimensioned structure.

Various modifications, changes or alterations may be resorted to without departing from the scope of the invention as defined by the appended claims.

We claim:
1. In a rocket motor construction having a nozzle structure for exhausting pressure fluid to normally provide a predetermined rocket motor thrust, means adjacent and downstream of said nozzle for selectively varying the rocket motor thrust, said nozzle including a throat member having concentrically spaced attaching means on rearward surfaces thereof, said throat member having diametrically opposed aperture means between said spaced attaching means and communicating with a rocket exterior surface, and said selectively varying means including a reversible nozzle expansion section having a conical lateral surface terminating in axially and transversely spaced attachment members, matingly engageable with corresponding ones of said concentrically spaced attachment means, a selected one of said section attachment members being secured to its mating throat attachment means.

2. The structure in accordance with claim 1 wherein said concentrically spaced attaching means include an internally threaded member and a relatively smaller and opposing externally threaded member, and said spaced attachment members include an externally threaded portion and a relatively smaller internally threaded portion.

References Cited by the Examiner

UNITED STATES PATENTS

| | | | |
|---|---|---|---|
| 2,695,495 | 11/1954 | Peterman | 60—35.6 |
| 2,847,822 | 8/1958 | Hausmann | 239—265.27 |
| 2,850,976 | 9/1958 | Seifert | 60—35.6 |
| 2,856,851 | 10/1958 | Thomas | 102—49 |
| 3,052,091 | 9/1962 | D'Ooge | 60—35.54 |

CARLTON R. CROYLE, *Primary Examiner.*